US00RE37483B1

(19) United States
(12) Reissued Patent
Kennedy et al.

(10) Patent Number: US RE37,483 E
(45) Date of Reissued Patent: Dec. 25, 2001

(54) CYLINDER LINER SECURING APPARATUS

(75) Inventors: George C. Kennedy, Kilmacolm; Stephen J. Flindall, Glengarnock, both of (GB)

(73) Assignee: P-Quip Limited (GB)

(21) Appl. No.: 09/190,799

(22) Filed: Nov. 12, 1998

Related U.S. Patent Documents

Reissue of:
(64) Patent No.: 5,572,920
Issued: Nov. 12, 1996
Appl. No.: 08/353,512
Filed: Dec. 9, 1994

(30) Foreign Application Priority Data

Dec. 11, 1993 (GB) ..... 9325388

(51) Int. Cl.[7] ..... F01B 29/00; F16J 15/18
(52) U.S. Cl. ..... 92/128; 92/130 A; 92/165 PR; 92/171.1
(58) Field of Search ..... 92/171.1, 128, 92/165 PR, 130 A

(56) References Cited

U.S. PATENT DOCUMENTS 3,435,777 * 4/1969 Schaaf ..... 92/171.1 X
3,438,334 * 4/1969 Schaaf ..... 92/171.1 X
3,635,616 * 1/1972 Venkatesan ..... 92/171.1 X
3,842,718 * 10/1974 Malchow ..... 92/171.1
4,566,372 * 1/1986 Zandel et al. ..... 92/171.1

FOREIGN PATENT DOCUMENTS 23 56 604 5/1975 (DE) .
24 11 927 5/1975 (DE) .
28 55 454 8/1979 (DE) .
32 18 000 11/1983 (DE) .
1 584 158 2/1981 (GB) .

* cited by examiner

*Primary Examiner*—John E. Ryznic
(74) *Attorney, Agent, or Firm*—Ratner & Prestia

(57) ABSTRACT

A device for securing a cylinder liner (3) to a respective pumping module (2) in a reciprocating pump has a set of arrangements each with a hydraulically activated piston (8), a rod (11) of which is adapted to receive a nut (12), the retraction of which forcibly compels in attraction the cylinder liner (3) and the pumping (2).

7 Claims, 1 Drawing Sheet

CYLINDER LINER SECURING APPARATUS

Figure 2:
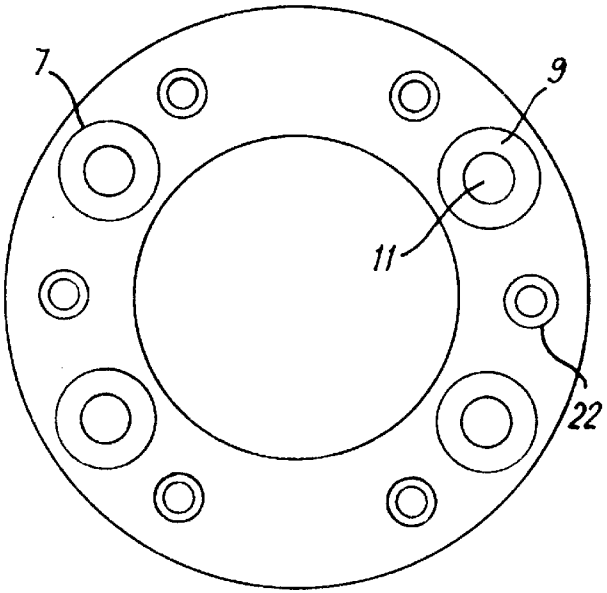

Matter enclosed in heavy brackets [ ] appears in the original patent but forms no part of this reissue specification; matter printed in italics indicates the additions made by reissue.

This invention is in the field of reciprocating pumps and particularly relates to a means for aligning and securing the cylinder liners of such pumps to their respective pumping modules. The means is also adapted to [energise] *energize* the seals of such liners.

Reciprocating pumps are well-known and a particular example discussed in the present specification is oil-field mud pumps. The invention is not, however, limited to mud pumps but finds application in a variety of reciprocating or positive displacement pumps.

In the past, there have been several different types of ways to attach cylinder liners to their respective pumping modules and these may vary according to make of pump in which they are used. One embodiment presently known employs a tapered concentric clamp, [whale] *while* another uses a concentric screw clamping arrangement.

It is important that the means for aligning and securing the cylinder liners may be implemented without undue effort and down-time. Cylinder liners are required to be changed frequently and this causes considerable inconvenience if the means and method for releasing the old cylinder liners and fitting the replacement cylinder liners are slow or difficult to operate. It has been found that existing systems or means for securing cylinder liners to respective pumping modules have been difficult to operate for a plurality of reasons, including the involvement of heavy components, the handling of which may be dangerous for operators. These systems also require considerable strength, skill and reliability of operators, together with the use of heavy tools in confined spaces. Yet further, the securing force is dependent on the extent of wear and the general condition of a plurality of the securing components.

According to the invention, there is provided a means for securing cylinder liners to pumping modules in reciprocating pumps, wherein said means includes a plurality of arrangements having a piston slidable within a hydraulic cylinder, said pistons having a rod adapted to receive a nut, said rods extending outwith their respective cylinders and being passed through respective apertures in a member adapted to grip said cylinder liner, wherein retraction of said piston and nut causes said member to forcibly compel said cylinder liner towards said pumping module.

Preferably, said arrangements are fastened to said pumping module. Preferably, said arrangements also include a spring or springs for location between the top of said cylinder and the piston. Hydraulic fluid can be inserted between the piston and the cylinder base by an external pressure source.

Preferably, there are four or more said arrangements spaced at intervals about and externally of the circumference of the cylinder liner.

Preferably, said means further includes non-rotational apparatus for preventing rotation of said pistons within said cylinders, wherein said non-rotational apparatus preferably includes one or more dowel rods which extend between said pistons and said cylinder base.

Preferably said member comprises a clamping ring having corresponding apertures for receiving said piston rods.

Figure 1:
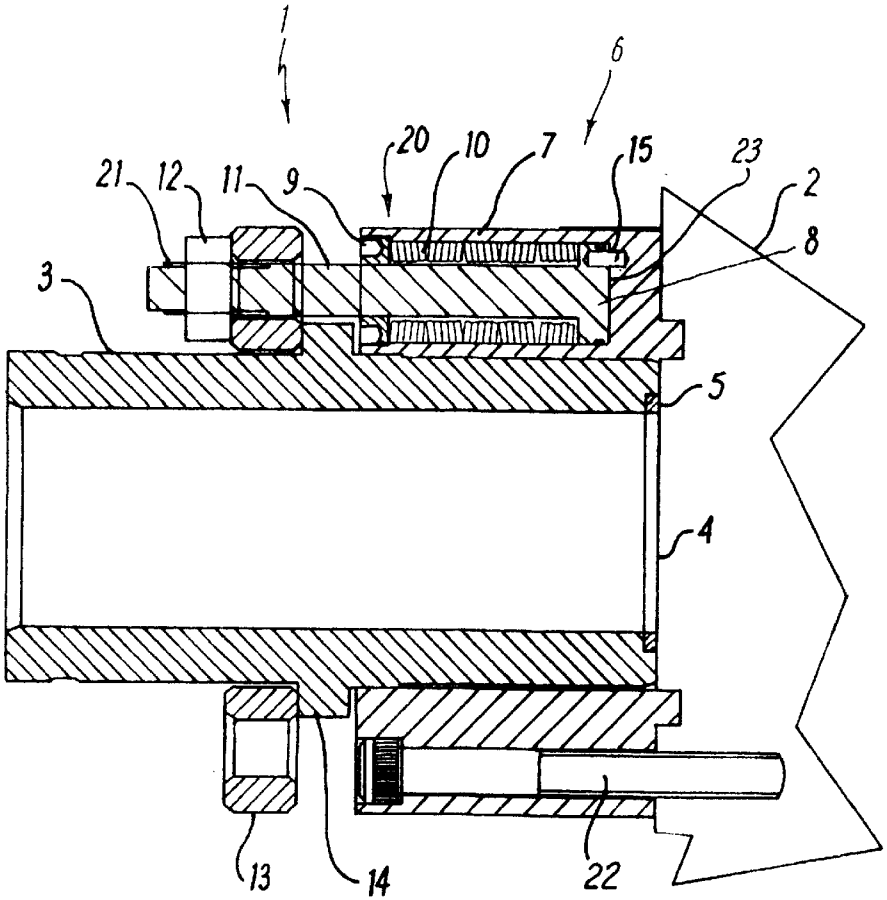

An example embodiment of the invention will now be described by way example only, with reference to the accompanying Figures, in which:

FIG. 1 is a sectional view of a cylinder liner and pump module incorporating the invention; and FIG. 2 is an end view of the securing means illustrated in FIG. 1.

A reciprocating pump generally described at 1 comprises a module 2 and cylinder liner 3. It is desirable that the cylinder liner 3 is securely held up against the face 4 of the module 2. Between the cylinder liner 3 and the module 2 there is-provided a seal 5 which, in its unenergized (i.e., uncompressed) state, usually [requires to] *must* be compressed by the cylinder liner 3[, thereby] *to close* a gap [is] created between the adjacent faces of the module 2 and cylinder liner 3.

In order to prevent the existence of this gap, it is necessary to forcibly push the cylinder liner 3 against the module 2 and this is achieved by securing means, generally described at 6. The effect of compressing the cylinder liner 3 against the face 4 of the module 2 is to [energise] *energize* or compress the seal 5. This compression is of course desirable to increase the effectiveness and efficiency of the seal 5. The securing means 6 comprises a plurality of assemblies *or arrangements* 20, wherein each assembly includes a cylinder 7 adapted to house a slidable piston 8, a plug 9 and clamping springs 10. The piston 8 is further provided with a rod 11 which extends outwith the cylinder 7. The rod 11 is provided with a threaded portion 21 adapted to receive the nut 12. Furthermore, the rod 11 passes through the shoulder or clamping ring 13 which circumnavigates the cylinder liner 3 and is pressed up against the lug 14 on the cylinder liner 3. In a preferable embodiment of the invention, there is provided one or more dowels 15 which engage both piston end plug in each arrangement for the purpose of preventing rotation of the piston.

In the embodiment shown, the securing means 6 includes four or more arrangements 20 having the aforesaid components 7, 8, 9, 10, 11, 12. These arrangements 20 are permanently bolted by the bolts 22 to the module 2, although the nuts 12 are detachable, thereby allowing removal of the cylinder liner 3.

In use, when a cylinder liner 3 is positioned against or nearly against the module 2, the shoulder or clamping ring 13 is then fitted over each of the piston rods 11. The nuts 12 are then threadably applied to the rods 11. The method of forcibly securing the cylinder liner 3 to the pumping module 2 is then implemented. This involves inserting hydraulic fluid [25] *23* between the piston head 8 and the cylinder base, such that the piston is extended to a greater extent outwith the cylinder 7 and the nut 12 is given freedom to be tightened by further rotation along the piston rod 11 towards the clamping ring 13. Preferably, this process is performed with all of the securing arrangements 20 simultaneously. It should be noted that the apparatus and method described herein allows the nuts 12 to be tightened by hand. It will be appreciated that this is a considerable advantage over the requirement of using heavy tools which has been the practice in the past.

The invention thus provides components which are considerably lighter than comparative components used heretobefore. In view of [it] negating the requirement of heavy tooling or handling, the components are less likely to be damaged during the removal or securing of cylinder liners and thus the invention permits greater repeatability and reliability. Furthermore, the need for intensive manual or skilled [labour] by operators is also mitigated. Similarly, there is a reduced danger of injury to operators or by-standers during such operational and maintenance functions.

A further advantage of the invention is that the clamping pressure may be predetermined by the springs and it is possible to achieve uniform pressure around the periphery of the liner, which enables perfect liner alignment.

Other advantages of the invention will become apparent to operators and associated personnel involved in the implementation and operation of the invention, including the fact that reduced time is required to affect the replacement of a cylinder liner.

Further modifications and improvements may be incorporated without departing from the spirit or scope of the invention.

We claim:

1. An apparatus for securing a cylinder liner to a pumping module in a reciprocating pump, said apparatus comprising [a plurality of] *one or more* arrangements *each fastened to said pumping module and* each having a piston slidable within a hydraulic cylinder, said piston [having] *being provided with* a rod *having a threaded portion* adapted to receive a nut, said rod extending *away from said pumping module* beyond its respective cylinder and *said threaded portion* being passed through a respective aperture in a member adapted to grip said cylinder liner, *said nut being received on said threaded portion,* wherein retraction of said piston and nut *towards said pumping module* causes said member to forcibly compel said cylinder liner towards said pumping module.

2. An apparatus as claimed in claim 1 [wherein the said] *further comprising a* plurality of arrangements [are] *each* fastened to said pumping module.

3. An apparatus as claimed in claim 1 wherein *each* said [plurality of arrangements each include] *arrangement includes* at least one spring located between the top of said cylinder and the piston.

4. An apparatus as claimed in claim 1 wherein the piston and the cylinder base define a space for accommodating hydraulic fluid.

5. An apparatus as claimed in claim 1 wherein said [plurality of arrangement] *one or more arrangements* comprise at least four arrangements spaced at intervals about and externally of the circumference of the cylinder liner.

6. An apparatus as claimed in claim 1 further including non-rotational means for preventing rotation of said piston within said cylinder, wherein said non-rotational means includes at least one dowel rod which extends between said piston and said cylinder base.

7. An apparatus as claimed in claim 1 wherein said member comprises a clamping ring having said aperture for receiving said rod.

* * * * *